United States Patent [19]

Ohmi et al.

[11] Patent Number: 4,977,916
[45] Date of Patent: Dec. 18, 1990

[54] MASS FLOW CONTROLLER

[75] Inventors: Tadahiro Ohmi, Sendai; Hiroshi Mihara, Kyoto; Kiyoshi Satoh, Mukoh, all of Japan

[73] Assignee: Stec Inc., Kyoto, Japan

[21] Appl. No.: 366,681

[22] Filed: Jun. 15, 1989

[30] Foreign Application Priority Data

Jun. 20, 1988 [JP] Japan ................................. 63-152673

[51] Int. Cl.$^5$ ............................................. G05D 7/00
[52] U.S. Cl. ....................................... 137/8; 137/486;
137/487.5; 204/192.12
[58] Field of Search .......................... 137/486, 487.5, 8;
251/205, 129.08, 129.06

[56] References Cited
U.S. PATENT DOCUMENTS

| 4,099,703 | 7/1978 | Lush | 251/205 X |
| 4,278,234 | 7/1981 | Baumann | 251/205 X |
| 4,585,209 | 4/1986 | Aine | 251/129.02 |
| 4,687,020 | 8/1987 | Doyle | 137/486 |
| 4,858,643 | 8/1989 | Vavra | 137/486 X |

Primary Examiner—Alan Cohan
Attorney, Agent, or Firm—Price, Gess & Ubell

[57] ABSTRACT

A mass flow controller including a valve assembly wherein a flow rate-controlling portion of the valve assembly is mirror finished and wherein the maximum flow rate through the flow rate-controlling portion during the time that the flow rate is not being controlled is set so as to be sufficiently large in comparison with the flow rate during control whereby a moisture purging function may be performed without external fluid bypass circuits.

7 Claims, 3 Drawing Sheets

MASS FLOW CONTROLLER

BACKGROUND OF THE INVENTION

1. Field of the Invention

The present invention relates to an improved mass flow controller comprising a mass flow meter portion for measuring a flow rate of a fluid and a fluid-controlling portion for controlling the flow rate of the fluid provided between a fluid inlet and a fluid outlet formed in a base member

2. Description of Related Art

In the prior art there is known a mass flow controller comprising a capillary tube having certain characteristics provided in a mass flow meter portion and at least one capillary tube having the same characteristics provided in a bypass portion. An exemplary prior art mass flow controller is disclosed in Japanese Patent Publication No. Sho 59-41126. The above-described prior art has shown the following disadvantages:

As a rule, a mass flow controller of this type has been used in a supply system of gases used for the production of semiconductors and the like in many cases. The gases to be controlled include many kinds of inert gas (such as $N_2$ and Ar), combustible gas (such as $H_2$, $SiH_4$ and $B_2H_6$), highly corrosive gas (such as HCl, $Cl_2$, $WF_6$ and $BCl_3$), and the like. In order to prevent the supplied gases from being contaminated with moisture left on an inner wall of the mass flow controller during the production of semiconductors, it is necessary to bake them out by flowing inert gases, such as highly pure $N_2$ (having the dew point of $-100°$ C. or less), through the mass flow controller as occasion demands to remove said moisture. This baking-out process is conducted by winding a tape heater around a gas piping system including the mass flow controller, or by directly electrifying said system, or by putting said system as a whole in a heat insulating vessel to heat it to an appointed temperature.

In the mass flow controller disclosed in the above-described Japanese patent, a ratio of the largest flow rate in the flow rate-controlling valve during the time when the flow rate is not being controlled to that during the time when the flow rate is being controlled amounts to about 5:1. In particular, with the mass flow controller of which the largest controlled flow rate is less than 100 cc/min, a disadvantage has occurred in that even though the baking-out process is continued for three months at a temperature of 120° C., a quantity of moisture is reduced to only 20 to 30 ppb.

This will be described below in more detail as to the case where, for example, the mass flow controller is used in a process gas supply system for producing semiconductors.

A thin film, which is used for large-scale integrated circuits (LSI), formed of polysilicon, $SiO_2$, $Si_3N_4$, Al, Al-Si and Al-Si-Cu is formed by sputtering or CVD (Chemical Vapor Deposition).

Generally, in the film formation by sputtering, Ar is used as a gas to be flown through the sputtering device. If a pattern of LSI is minute, aspect ratios of a contact hole and a through hole connecting a silicon substrate with the top and bottom of wiring and multi-layer wiring are increased. If the thin and deep contact hole and through hole, having a diameter of submicrons, are to be neatly filled with electrode materials, the process gas pressure during the sputtering is reduced to, for example, the order of $10^{-3}$ Torr. If it is intended to hold a quantity of exhaust gas by a pump for the exhaust of the process chamber at a practical one, it is natural that a flow rate of Ar gas supplied is reduced with a reduction of process gas pressure.

On the other hand, the gases used in the film formation by CVD include $SiH_4$, $Si_2H_6$, $WF_6$, $NH_3$ and the like and, in general, a flow rate thereof is large.

In addition, with a device for RIE (Reactive Ion Etching) for etching minute patterns and a device for ion injection, the flow rate of gases is less than 100 cc/min in almost all cases.

The largest flow rate of the mass flow controller used for the precise control of such a small flow rate of gas is usually at most 100 cc/min.

The mass flow controller has been a part which is frequently clogged by reactive gas sediment and the like. This clogging trouble is not caused by the mass flow controller itself, but rather by $SiO_x$ powders and the like, which are reaction products of the moisture, which is the main ingredient of gases entering the gas piping system from outside or gases escaping through an inner wall of the gas piping system and, for example, $SiH_4$ and $Si_2H_6$ in almost all cases.

In addition, the technological advancement of parts and techniques, such as butt welding, has, for the last four to five years, led to a reduction in the quantity of gases entering the gas piping system to $1 \times 10^{-11}$ Torr-liter/sec (limit of the detector) or less. At present, gases comprising moisture as the main ingredient discharged from the inner wall of the gas piping system is the largest source of pollution.

Accordingly, the gas piping system including the mass flow controller and the like is assembled and then purged with ultrahighly pure $N_2$ gas or Ar gas to remove pollutant molecules adsorbed into the inner wall of the gas piping system. It is necessary that difficult to remove molecules, such as water, be baked at at least 100° C. or more.

In view of the high possibility of complications and the necessity of periodical flow rate compensation, the mass flow controller is incorporated in the gas piping system in the form of a unit as shown in FIG. 2. Referring to FIG. 2, reference numeral 101 designates a mass flow controller, reference numerals 102, 103, 104, 105 designate stop valves, reference numeral 106 designates a gas flow inlet, reference numeral 107 designates a gas flow outlet, and reference numeral 108 designates a bypass line. The stop valves 102 and 104 and the stop valves 103 and 105 form an integral double three-way monoblock valve, respectively. When the process gases are flowed, the stop valves 102 and 103 are opened, while the stop valves 104 and 105 are closed. When the mass flow controller 101 is removed, the stop valves 102 and 103 are closed, the stop valves 104 and 105 are opened, and then a purge gas, such as $N_2$ or Ar, is flowed in the course of the gas flow inlet 106→the bypass line 108→the gas flow outlet 107 to carry out the desorption.

FIG. 3 shows the gas purge effect in the case where the mass flow controller having a maximum flow rate of 20 cc/min is incorporated in the gas piping system of the device for RIE.

Referring to FIG. 3, the axis of ordinate shows the dew point and moisture concentration of $N_2$ gas used for the purge immediately before it passes through the gas piping system to flow into the device. The axis of abscissa shows a number of days for which the purge has been continued. The quantity of moisture in $N_2$ gas used for the purge is 1 ppb or less. The relation of the dew point and the moisture concentration has already been shown in the respective handbooks. Roughly speaking, $-90°$ C.: 95 ppb, $-100°$ C.: 14 ppb, $-110°$ C.: 1 ppb.

The thick full line in FIG. 3 shows a state in which the purge is carried out through the bypass line with $N_2$ gas having a flow rate of 5 liters/min. The thin full line shows a state in which the purge is carried out through the mass flow controller with $N_2$ gas having a flow rate of 100 cc/min. In addition, the upper oblique lines in FIG. 3 show that the whole system is heated to 120° C. when the gases are flowing, while the portions not having oblique lines show that the whole system is not heated. It is found that if the purge is carried out with $N_2$ gas having a flow rate of 5 liters/min, the dew point arrives at $-100°$ C. (moisture concentration of 1 ppb) after several days, but, in the case where the purge is carried out through the mass flow controller with $N_2$ gas having a flow rate of 100 cc/min, the dew point is lowered to about $-95°$ C. and the moisture adsorbed into the inner wall of the mass flow controller cannot be completely removed. In addition, the purge was carried out through the mass flow controller with $N_2$ gas for three months with repeated baking, but the dew point reached at most $-97°$ C. (moisture concentration of 25 ppb).

It is absolutely required for the enhancement of the performance of the process that the purge of the mass flow controller lead to the dew point of $-110°$ C. (moisture concentration of 1 ppb) for at least about one week.

The present invention has been achieved paying attention to the above-described matters.

SUMMARY OF THE INVENTION

It is an object of the present invention to provide a mass flow controller provided with a purge function, capable of completely removing the moisture in a short time without providing an external circuit, by baking out.

In order to achieve the above-described object, in the mass flow controller according to the present invention a flow rate-controlling portion of a flow rate-controlling member that is provided in a fluid-controlling portion is mirror-finished and the maximum flow rate in said flow rate-controlling portion during the time when the flow rate is not being controlled is set so as to be sufficiently large in comparison with that during the time when the flow rate is being controlled to give the purge function.

With the above-described construction, since the flow rate-controlling portion of the flow rate-controlling member is subjected to mirror-finishing, the minute flow rates can be very accurately controlled. Furthermore, since the largest flow rate in the flow rate-controlling portion during the time when the flow rate is not being controlled is set so as to be sufficiently large in comparison with that during the time when the flow rate is being controlled, the moisture can be completely removed in a short time without providing any external circuits when baked out using a purge mode.

DETAILED DESCRIPTION OF THE PREFERRED EMBODIMENTS

One preferred embodiment of the present invention will be described below with reference to the drawings.

Figure 1:
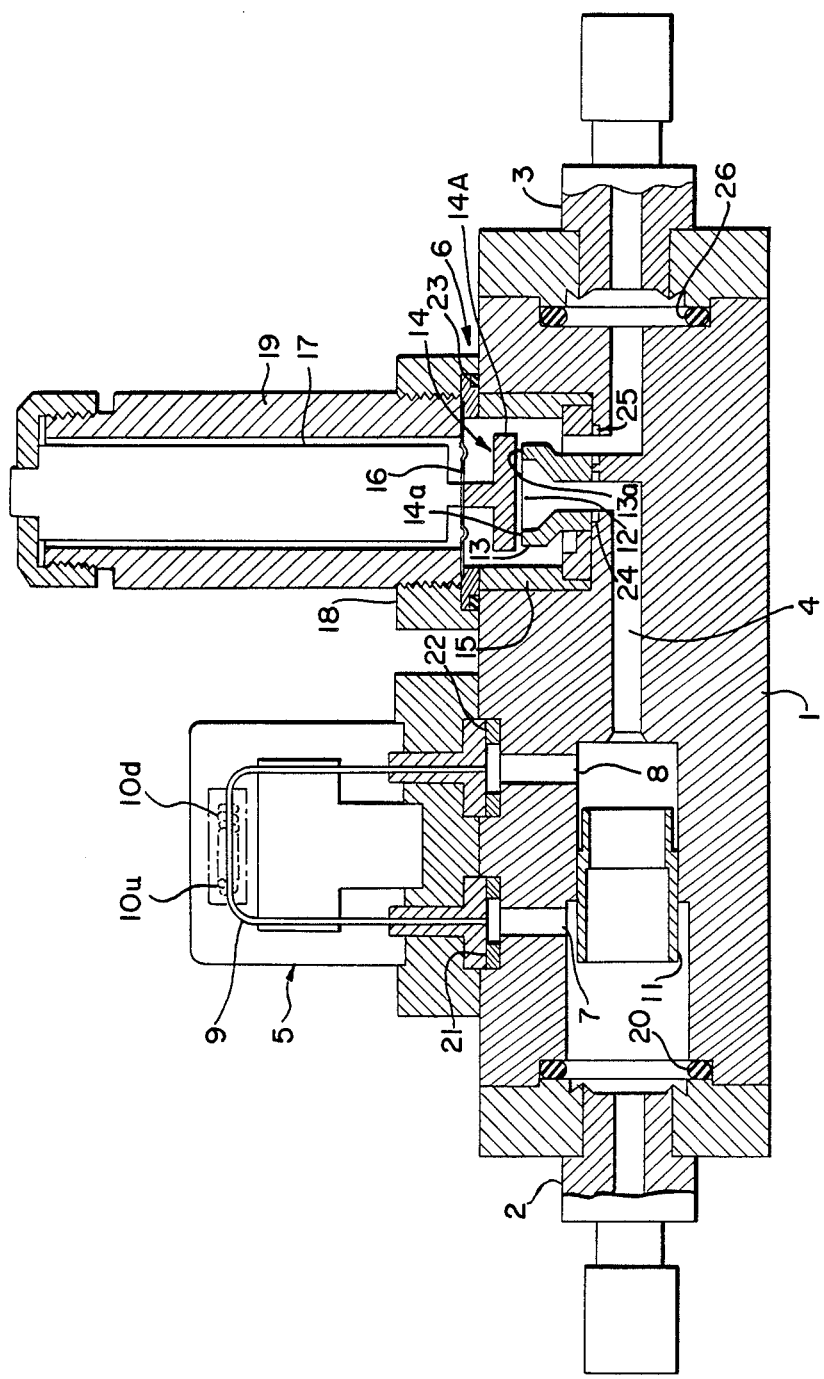
FIG. 1 is a longitudinal sectional view showing a mass flow controller according to a preferred embodiment of the present invention.
Figure 2:
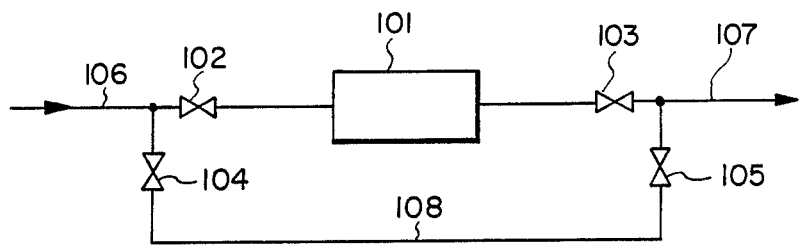
FIG. 2 is a block diagram for describing the prior art.
Figure 3:
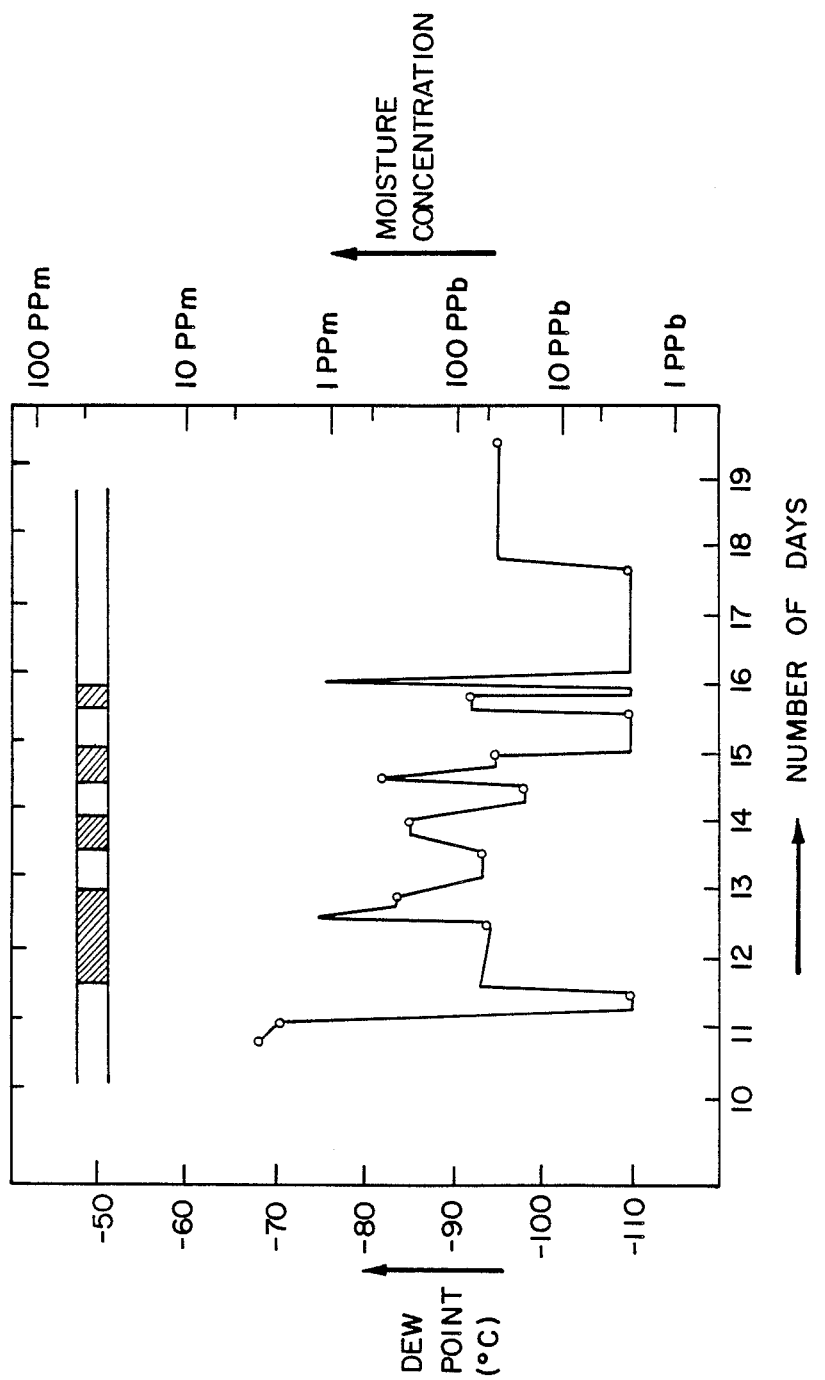
FIG. 3 is a diagram for describing the gas purge effect.

FIG. 1 shows one example of a so-called normal open-type mass flow controller. Referring now to FIG. 1, reference numeral 1 designates a base member and reference numerals 2 and 3 designate a fluid inlet and a fluid outlet, respectively, formed in said base member 1. Reference numeral 4 designates a fluid passage formed between said fluid inlet 2 and said fluid outlet 3, said fluid passage 4 being provided with a mass flow meter portion 5 and a fluid-controlling portion 6. Although said mass flow meter portion 5 is shown to be on the upstream side of said fluid-controlling portion 6, this arrangement may be reversed.

Said mass flow meter portion 5 comprises resistors $10u$, $10d$ comprised of, for example, a thermal mass flow sensor wound around a conduit 9. The conduit 9 is formed of, for example, a thin-walled capillary tube connecting a sample passage inlet 7 to a sample passage outlet 8, said sample passage inlet 7 and said sample passage outlet 8 being opened so as to face to the fluid passage 4. Said thermal mass flow sensors $10u$, $10d$ are connected to a bridge circuit (not shown). Reference numeral 11 designates a bypass portion, said bypass portion formed in the fluid passage 4 having constant flow-dividing ratio characteristics.

The fluid-controlling portion 6 has the following construction: The fluid passage 4 is provided with a valve seat 13 having a valve mouth 12 on the downstream side of said bypass portion 11 and a valve body 14 for regulating the openness of the valve mouth 12 so that a valve head 14A thereof may be close to the valve mouth 12. This valve body 14 is supported by means of a metallic diaphragm 16 so as to be moved in the up and down direction within a valve guide 15 and so as to usually form some gap between the valve seat 13 and the valve body 14.

Furthermore, opposite portions of said valve seat 13 and valve body 14 (collectively referred to as a flow rate-controlling member) and, in particular, the flow rate-controlling portions $13a$, $14a$, are subjected to mirror-finishing so as to form a remarkably flat plane (having $R_{max}$ of 0.5 microns or less). $R_{max}$ refers to the maximum roughness height variance from a surface of the plane. The valve seat includes an enlarged bell mouth annular rimmed valve port that is larger than the fluid passage 4.

Reference numeral 17 designates a valve body-driving portion (actuator) for driving the valve body 14 in the appointed direction comprising a piezo-stack formed of a plurality of, for example, laminated piezo-elements. This valve body-driving portion 17 is housed in a cylindrical cover member 19 screwed on a valve block 18 and an output portion thereof is displaced downward by applying the appointed direct current thereto, whereby the valve body 14 is descended to change the openness of the valve mouth 12.

In the above-described fluid-controlling portion 6, the maximum flow rates in the flow rate-controlling members 13, 14 during the time when the flow rate is not being controlled are set so as to be remarkably large, for example, 50 to 100 times or more, in comparison with those during the time when the flow rate is being controlled.

In addition, referring to FIG. 1, reference numerals 20 to 26 designate metallic O-rings used as sealing members.

In the mass flow controller having the above-described construction, since the flow rate-controlling portions 13a, 14a of the flow rate-controlling members 13, 14 have been subjected to mirror-finishing, the openness of the valve mouth 12 can be regulated to the order of between submicrons and microns, and the resolution power can be enhanced so much that the remarkably small flow rate can be controlled with high accuracy. Furthermore, since an orifice diameter of the flow rate-controlling member 13 may be increased to about 20 times, whereas, in the prior art, the openness of the flow rate-controlling member 13 may also be increased to about three times, the largest flow rate during the time when the flow rate is not being controlled is remarkably large in comparison with that during the time when the flow rate is being controlled, and the inert gases can be flown through the mass flow controller having a maximum controlled flow rate of less than 100 cc/min under the purge mode condition without providing any external circuits, such as a bypass line, during the baking-out process, whereby the baking-out time can be shortened and the moisture can be completely removed.

The present invention is not limited by the above-described preferred embodiment. For example, the valve body-driving portion 17 may be constructed by various other modes, such as a thermal driving mode. In addition, the present invention can also be applied to the normal close-type mass flow controller.

What is claimed is:

1. An improved mass flow controller for monitoring a flow rate of a fluid and for purging a fluid delivery system of moisture, comprising:
   a fluid intake conduit adapted to be connected to a source of fluid;
   a mass flow meter connected to the fluid intake conduit including a capillary tube and a flow sensing means connected to the capillary tube for providing a signal of the flow rate, and
   a fluid controlling portion including an annular rimmed valve port with a conduit connected to the intake conduit and having a flat mirror finish surface, the valve port being significantly larger than a cross-sectional size of the conduit, a valve head having a flat mirror finish, a support diaphragm for positioning the valve head adjacent the annular rimmed valve port, and a valve drive means for driving the valve head relative to the valve port in response to the flow rate signal, the mirror finish surface having a maximum surface roughness height of 0.5 microns, wherein the fluid controlling portion can accurately control a very low flow rate and can also provide a large purging rate of flow to remove moisture from a fluid delivery system.

2. The improved mass flow controller of claim 1 wherein the fluid intake conduit includes a bypass portion having a constant flow dividing ratio characteristic to the capillary tube.

3. The improved mass flow controller of claim 1 wherein the valve drive means includes a plurality of piezo elements.

4. The improved mass flow controller of claim 1 wherein the valve port has an enlarged bell mouth configuration.

5. An improved mass flow controller having a mass flow meter portion for measuring a flow rate of a gas and a gas-controlling portion for controlling the flow rate of the gas provided between a gas inlet and a gas outlet, the improvement comprising:
   said gas-controlling portion having a controlled flow position wherein the gas flow rate may be accurately controlled at very low flow rates and a purging flow position wherein the gas flow rate is increased to a gas flow rate that exceeds the gas flow rate in the controlled flow position by a factor of at least 50, the gas-controlling portion consists of a gas control valve, the operative surfaces of said gas control valve having a mirror-finish in order to achieve the high control accuracy at very low flow rates, the gas-controlling portion consists of a gas control valve comprised of a valve head which movably opposes a valve mouth, the opposing planar surfaces of the valve head and the valve mouth being mirror-finished so as to provide a very low and controlled flow rate that may be varied with high accuracy, wherein the planar surfaces of the valve mouth and valve head have a maximum height variance of 0.5 microns or less from their surfaces.

6. The improved mean flow controller of claim 5 wherein the valve head is movably supported by a metal diaphragm.

7. In a method of controlling the supply of gases in the production of semiconductor elements to prevent the contamination of moisture with a mass flow controller having a mass flow meter and a gas-controlling portion with a valve assembly of an enlarged annular rimmed valve port of a mirror finish surface having a maximum surface roughness height of 0.5 microns and a valve head, also of a mirror finish surface, having a maximum surface roughness height of 0.5 microns, the gas-controlling portion connected to a source of purging gas such as $N_2$ or Ar gas, the improvement comprising:
   increasing the flow rate of a nitrogen purging gas through the valve assembly to 5 liters/minute for several days to provide a new point of $-100°$ C., and
   subsequently precisely controlling the flow of argon through the same valve assembly at less than 100 cc/minute to enable sputtering for semiconductor production.

* * * * *